3,317,279
POLYMORPH OF CALCIUM DISILICIDE AND
ITS METHOD OF PREPARATION
Meyer S. Silverman, Elkins Park, Pa., assignor to Pennsalt Chemicals Corporation, Philadelphia, Pa., a corporation of Pennsylvania
No Drawing. Filed Mar. 15, 1963, Ser. No. 265,343
10 Claims. (Cl. 23—204)

This invention relates to a new polymorph of calcium disilicide, $CaSi_2$.

The new polymorph has the same chemical composition as the currently known calcium disilicide but it has a distinctly different crystalline structure. The new polymorph is different from the previously known $CaSi_2$ in crystalline structure as indicated by X-ray diffraction analysis, in density as determined by analysis of X-ray diffraction data and by the usual specific gravity determination procedures, in color, in electrical properties and in chemical reactivity. Many well known materials undergo transient polymorphic transformations when subjected to high pressures with reversion to the original form upon reduction of pressure. The polymorph of the present invention has been found to be completely stable and does not revert to the original crystalline structure at atmospheric pressure even over time intervals in excess of one year and at temperatures as high as 500° C.

The previously known form of calcium disilicide has a hexagonal layer type crystalline structure which is described in detail in Die Krystallstruktur des Calciumsilicids $CaSi_2$, J. Böhm and O. Hassel, Z. anorg. u. allgem. Chemie, 160, 152 (1927).

Analysis of the X-ray diffraction pattern of the polymorph of calcium disilicide according to the methods of "The Interpretation of X-ray Diffraction Photographs" by N. F. M. Henry, H. Lipson and W. A. Wooster, MacMillan & Co., Ltd., St. Martins Street, London (1953), pages 180–181 strongly indicates a tetragonal crystalline structure for the compound of this invention.

Because of its dense crystalline configuration and the physical and chemical properties discussed above, the new polymorph is useful for a wide variety of applications including such applications as elements in measuring instruments, as the abrasive in polishing and abrading discs, as pigments, as elements in chemical process equipment, and most particularly, as electrical circuitry components. The unique density of the new polymorph together with its chemical resistivity (which is hereafter demonstrated to be markedly superior to that of the previously known hexagonal form) make it especially useful for density measuring floats, rotameter balls, manostats, and other measuring elements where specific density coupled with chemical resistivity is required. As a specific abrasive, the new polymorph is useful for polishing and grinding metals, glasses, synthetic gems, and a wide variety of metallic alloys. In contrast to the normal dull gray appearance of the previously known form of calcium disilicide, the new polymorph exhibits a bright coral color which, together with its high chemical resistance and general stability, makes it particularly suited for use in pigments and most especially for use in pigments which must withstand highly corrosive atmospheres. The chemical resistivity of calcium disilicide, which is hereafter demonstrated to be markedly superior to that of the previously known hexagonal form, enables the new polymorph to be used in a variety of applications in chemical process equipment, including protective devices for thermocouples and thermometers and coating for pressure sensing bellows and for frangible discs. The unusual and readily visible color change which accompanies the transformation of calcium disilicide from the hexagonal form to the new polymorph makes the new polymorph valuable in that its presence indicates that certain temperatures and pressures have been achieved in the area in which it is placed. Thus, piezometric device can readily be constructed to permit the quick, economical determination of whether a given pressure has been reached in a confined area at elevated temperature and to further permit accurate calibration of devices for the application of extremely high pressures to confined areas. Especially important are the electrical properties of the new polymorph which, as illustrated in Example 3, differ greatly from those of the previously known hexagonal form. The specific electrical resistivity of the new polymorph is above that of the most resistive metals and yet is well below the resistivity of commonly used insulating materials. The new polymorph may therefore be used in a number of electrical applications where resistivity in this specific range is desirable and most importantly, the new polymorph shows value as a semi-conductor material of unique characteristics.

The process for manufacturing the new polymorph involves a criticality of both temperature and pressure. At pressures below about 15 kilobars, virtually no yield of the new polymorph is obtained, even at temperatures as high as 1500° C. Similarly, at temperatures below 600° C., virtually no yield is obtained even at pressures as high as 80 kilobars. Therefore, although the new polymorph is virtually completely stable at room temperature and at atmospheric pressures, its manufacture requires a *combination* of high temperatures of at least 600° C. and pressures of at least 15 kilobars, and neither extremely high temperatures alone nor extremely high pressures unaccompanied by high temperatures will cause its formation.

The raw material charge for the practice of the present invention will preferably contain calcium disilicide or, alternatively, will contain precursors which form calcium disilicide in situ in the course of the process. The term precursor is intended to include any combination of ingredients which will produce $CaSi_2$ in situ under the action of the temperature and pressure required to produce the new polymorph. The term precursor also includes any reducing agent, including electrolytic reduction, which is necessary to cause the in situ production of $CaSi_2$.

Thus the invention comprises the application of temperatures of at least 600° C. and pressures of at least 15 kilobars to a charge which contains some $CaSi_2$ obtained by any means, including the following: the inclusion of the hexagonal-structured form of $CaSi_2$ in the initial starting material charge; the inclusion of elemental calcium and silicon as precursors in the initial starting material charge with subsequent chemical combination of the elements under the influence of the elevated temperature and pressure to form $CaSi_2$; or the inclusion of salts of calcium and silicon as precursors in the charge with subsequent reduction of the salts to form $CaSi_2$. This latter reduction may be accomplished by chemical means, as for example, the reaction illustrated in Example 1 wherein calcium oxide and silicon are reacted in the presence of carbon as a reducing agent, or where calcium oxide is added to an excess of silicon to form, under the elevated temperature and pressure, $CaSi_2$ and some $SiO_2$. Other methods of producing $CaSi_2$ through precursors include the chemical reduction of $SiO_2$ with a reducing agent such as elemental carbon in the presence of either Ca or CaO, the latter being reduced simultaneously with the $SiO_2$; the reaction of a calcium halide with silicon or a silicon halide with calcium or the simultaneous decomposition of calcium halide with silicon halide; reduction of elemental silicon by $CaH_2$; reaction of calcium monosilicide with Si; and a wide variety of other conventional reaction mechanisms. The precursor may also be electrically reduced. By electrical reduction is meant a process similar to fused salt elecrtolysis which is capable of producing either the uncombined elements calcium and silicon or directly producing calcium disilicide.

It will be recognized by those skilled in the art that a wide variety of techniques are available for including calcium disilicide in the charge and the above-mentioned means and the examples given hereafter are merely illustrative of some of the processes available to accomplish this objective. Since the novelty of the present invention is not dependent upon the source of calcium disilicide, the invention includes all processes for producing the new polymorph by subjecting a charge which includes calcium disilicide to pressures at at least 15 kilobars and temperatures of at least 600° C. regardless of the techniques used for including calcium disilicide in the charge.

The pressure for the practice of the present invention will be not less than 15 kilobars, preferably not less than 20 kilobars, more preferably not less than 40 kilobars, and most preferably will be from 40 to about 80 kilobars (one kilobar equals 986.924 atmospheres). Below pressures of about 15 kilobars, no yield of the new polymorph was obtained even at extremely high temperatures ranging up to 1500° C., and this critical pressure requirement is an important factor in the practice of the present invention. Use of pressures in excess of 80 kilobars is less desirable since at the preferred temperatures of 1000° C. and up, the conversion to the new polymorph is essentially complete at lower pressures, and the increased effort required to reach pressures in excess of 80 kilobars is not rewarded by any substantial increase in yields.

A temperature of not less than about 600° C. is required for the practice of the present invention, and temperatures of 800° C. are preferred, with temperatures above 1000° C. being more preferred. At the most preferred pressure range of 40 to 80 kilobars, the conversion to the new polymorph will be essentially complete at temperatures of 1600° C. and the most preferred range of temperature and pressure for the practice of the present invention is therefore a temperature of from 1000° to 1600° C. in conjunction with pressures in the range of from 40 to about 80 kilobars.

The time sufficient to produce the new polymorph will generally be from 1 second to about 24 hours and will preferably be from 1 minute to about 1 hour, and most preferably from 2 to about 10 minutes.

Where calcium disilicide of the previously known hexagonal form is used as the starting material, the molar ratio of calcium to silicon will, of course, be 1:2. Where oxidized forms of calcium and silicon are employed as the starting materials, they are preferably supplied in approximately stoichiometric ratio and the reducing agent will preferably be present in approximately twice the stoichiometrically required amount, with excesses of reducing agent of from 3 to about 10 times the stoichiometric amount being more preferred.

The apparatus used in the examples which illustrate the practice of the present invention is similar to that developed at the National Bureau of Standards and described in "Compact Multianvil Wedge Type High Pressure Apparatus," E. C. Lloyd, U. O. Hutton and D. P. Johnson in the Journal of Research of the National Bureau of Standards, vol. 63C, No. 1, July–September 1959, pages 59–64. In place of the 9/16" tetrahedral sample holders used in the above reference, 5/8" holders with 1/2" anvil faces were employed in the examples which follow and, alternatively, 5/16" holders were used with 3/4" anvil faces. A polyester film ("Mylar" manufactured by Du Pont Company) was used between the anvil assemblies and the polytetrafluoroethylene sheet ("Teflon," manufactured by Du Pont Company). Additionally, a 0.003" wall boron nitride sleeve was used between the sample and the graphite heaters as electrical insulation. Force was applied to the tetrahedral anvil system by a Watson-Stillman 100-ton hydraulic laboratory press. Pressure calibration was done by measuring the electrical resistance change of bismuth samples. Pressure was measured as a function of ram force and the three discontinuities were considered to occur at 25.4, 27.0 and 88 kilobars. In all of the preparations, a thin sleeve of spectroscopic grade graphite was used as the heating element around the sample, and end plugs of the same material isolated the sample from the platinum or silvered tabs that carried the current from the anvils to the heating sleeve. Temperature calibrations were done by measuring the electrical power input required to obtain temperatures which were indicated by a Chromel-Alumel thermocouple, the tip of which was in good contact with the center of the graphite heating sleeve. The temperatures reported here are thus the highest to which any part of the sample was subjected, and it should be recognized that the ends of the sample in each case were somewhat cooler. Experience in repeated calibrations indicates that the temperature values are uncertain by approximately $+50°$ C., but the relative differences among the temperature levels of the experiment are believed to be quite reliable.

In each preparation the sample was first compressed in the high pressure apparatus, then heated, and then held at the desired conditions for a measured period of time. The high pressure was then maintained until the power was turned off and the sample had cooled to nearly ambient temperature. Cooling was very rapid in all cases.

Yields at higher pressures using the hexagonal form of $CaSi_2$ as a starting material were excellent, with yields of virtually 100% conversion to the new polymorph being achieved in 10 minute heating periods at 1250° C. and 42 kilobars, and at 1000° C. and at 50 kilobars. A 3 minute heating period at 83 kilobars and 1000° C. also gave virtually 100% conversion to the new high pressure form of $CaSi_2$.

The distinctiveness of the new polymorph from the previously known hexagonal crystalline form of $CaSi_2$ is strikingly demonstrated by a number of physical changes. Under microscopic examination, the hexagonal form of calcium disilicide appears a metallic silver-gray color, while the new polymorph of calcium disilicide has been found to be a reflective coral material. The color of the new polymorph is apparently not due to impurities in the original starting material since it persists even when spectrochemically pure starting materials are employed in the preparation.

Another striking distinction between the hexagonal and the new form of $CaSi_2$ is the substantially reduced reactivity of the new polymorph with HCl as illustrated by Example 4. In concentrated HCl the hexagonal form reacts with vigorous effervescence whereas the new form, even when finely ground, undergoes only slight reaction.

As is illustrated by Example 3, the new polymorph has an electrical resistivity which is a full order of magnitude less than that exhibited by the previously known hexagonal form of $CaSi_2$.

Other significant differences in physical properties between the starting hexagonal crystalline structure of $CaSi_2$ and the new high pressure polymorph are those of density and X-ray diffraction pattern. The density of the hexagonal $CaSi_2$ was measured by weighing, in air and in toluene, pellets which had been subjected to pressure in the range of 40 kilobars at ambient temperatures in order to compact them without causing them to be converted into the new polymorph. The density determined by these measurements was 2.47±0.02 grams per cc. which is in good agreement with the 2.46 grams/cc. reported in the Böhm and Hassel article cited above. Similarly determined densities of a number of samples of the high pressure polymorph ranged from 2.60 to 2.76±0.02 grams per cc. The latter value was obtained from a product formed under the most severe combination of conditions, 80 kilobars pressure and 1500° C. This highest value is therefore based on the sample most nearly containing 100% of the new polymorph and is believed to be closest to the correct density of the new form.

The X-ray diffraction patterns for the hexagonal starting material, the American Society for Testing Materials standard for $CaSi_2$, and the new polymorph of $CaSi_2$ are listed in Table I.

TABLE I.—X-RAY DIFFRACTION POWDER PATTERNS OF $CaSi_2$

| Hexagonal Starting Material | | ASTM File | | New Polymorph | |
|---|---|---|---|---|---|
| d(A) | I [1] | d(A) | I | d(A) | I |
| 3.28 | 15(W)[2] | 3.31 | 12 | | |
| 3.11 | 15(W) | 3.08 | 12 | | |
| 3.03 | 15(W) | | | | |
| 2.63 | 50(S) | 2.66 | 40 | 2.77 | 100 |
| 2.53 | 15(W) | 1.55 | 28 | | |
| 2.13 | 15(W) | 2.13 | 16 | 2.28 | 80 |
| 1.92 | 100(VVS) | 1.92 | 100 | 2.14 | 55 |
| 1.70 | 15(W) | | | 1.75 | 55 |
| 1.63 | 15(W) | 1.64 | 15 | | |
| 1.56 | 5(VW) | | | 1.56 | 50 |
| | | | | 1.512 | 30 |
| 1.45 | 15(W) | 1.43 | 6 | | |
| | | | | 1.326 | 30 |
| | | | | 1.235 | 25 |

[1] I values are the relative intensity of the individual lines, relative to the strongest line in the pattern which is taken as 100.
[2] Starting material pattern originally reported as "weak" through "very very strong," later transposed to numerical values.

It will be noted that the starting material is in good agreement with the ASTM standard file pattern for the previously known hexagonal form and that the X-ray diffraction pattern of the new polymorphic form of $CaSi_2$ bears little resemblance to that of the hexagonal form. As is well known, X-ray spectrographs uniquely characterize crystalline structures and the above X-ray diffraction pattern is a definitely description of the new polymorph.

When the X-ray diffraction pattern of the new polymorph is analyzed according to the methods of Henry, Lipson and Wooster, cited above, and the methods of "Chemical Crystallography" by C. W. Bunn, Oxford-Clarendon Press (1945), pages 132–134, a tetragonal structure is clearly indicated. The excellent agreement between the observed X-ray diffraction pattern and the values which would be calculated for a tetragonal structure is shown in Table II below:

TABLE II.—X-RAY POWDER DIFFRACTION PATTERN OF HIGH PRESSURE FORM OF CALCIUM DISILICIDE

| d(A)[a] | I | Hkl | $Sin^2\Theta$ | |
|---|---|---|---|---|
| | | | Observed | Calculated [b] |
| 2.77 | 100 | 210 | 0.774 | 0.766 |
| 2.28 | 80 | 002 | .1143 | .1164 |
| 2.14 | 55 | 102 | .1297 | .1317 |
| 1.76 | 55 | 212 | .1918 | .1929 |
| 1.56 | 50 | 222, 400 | .2442 | .2388, .2450 |
| 1.512 | 30 | 302, 410 | .2599 | .2542, .2603 |
| 1.326 | 30 | 213, 421 | .3380 | .3387, .3353 |
| 1.235 | 25 | 223 | .3896 | .3843 |

[a] Copper $K\alpha$ radiation.
[b] Assuming tetragonal structure with a=6.23 A. and c=4.52 A.

When densities are calculated on the basis of a tetragonal structure with a=6.23 A. and c=4.52 A. assuming 3 $CaSi_2$ molecules per unit cell, a value of 2.73 grams/cc. is obtained. This figure must then be corrected for the iron content. On the basis of 2.6% by weight Fe in the final product, a composition of approximately $$Ca_{0.93}Fe_{0.05}Si_{2.00}$$

is indicated. Assuming a simple substitution of Fe for Ca to this extent in the proposed $CaSi_2$ structure, the calculated density becomes 2.75 grams/cc. Thus the calculated density, when corrected for iron content, is in excellent agreement with the measured value, and the tetragonal structure is clearly indicated.

Example 1 illustrates that iron is not a necessary constituent of the new structure. By reacting calcium oxide, silicon and carbon, all of extremely high purity, a product having the X-ray powder diffraction pattern of Table II was obtained. This same X-ray diffraction powder pattern was obtained on products from repeated experiments similar to Example 1 and the pattern is thus characteristic of the new high pressure polymorph of calcium disilicide itself, the presence of iron being purely incidental.

*Example 1.—Preparation of new polymorph of $CaSi_2$*

A mixture of two parts by weight of 99.999+% pure Si, one part of 99+% of spectroscopic grade graphite and one part of 99.9% pure calcium oxide (prepared by heating National Bureau of Standards grade calcium carbonate in a controlled atmosphere to a temperature of 925° for about 75 minutes) is inserted into the tetrahedral anvil apparatus. The mixture is first compressed to a pressure of 45 kilobars and is then heated to a temperature of 1500° C. After being held at a temperature of 1500° C. for 10 minutes, the heater power is switched off and after a cooling period of 5 minutes the pressure is released and the product examined.

The product is found to be a silver-gray metallic lustrous material imbedded with reddish glassy particles. Very faint coral-pink color is observed in the outer rim of the cylindrical shaped product.

The X-ray diffraction pattern of the product indicated the new high pressure form of $CaSi_2$ together with some uncombined Si, some CaO and some impurities.

*Example 2.—Preparation of new polymorph of $CaSi_2$ from commercial grade $CaSi_2$*

Commercial $CaSi_2$ is analyzed gravimetrically and found to be composed of 61.3% by weight Si, 6.1% Fe, and 32.3% Ca. The X-ray diffraction pattern for this starting material is shown in Table I, indicating good agreement with the American Society for Testing Materials standard pattern for the hexagonal form of $CaSi_2$.

The above starting material is placed in the tetrahedral anvil apparatus and a pressure of 46 kilobars is applied. The temperature is then raised to 1480° C. for approximately 10 minutes, after which time the electric heaters are turned off and the sample and apparatus allowed to cool for about 5 minutes. Examination of the sample after cooling shows a coral product which analyzes well for $CaSi_2$. (39.0% by weight Ca, 58.7% by weight Si and 2.8% by weight Fe). The X-ray diffraction analysis of this material shows the known pattern of Si and that previously found characteristic of the new high pressure polymorph of $CaSi_2$ which was produced in Example 1.

*Example 3.—Determination of electrical resistance of common $CaSi_2$ and new polymorph*

A sample of $CaSi_2$ identical with the starting material of Example 2 is placed in the tetrahedral anvil apparatus and a pressure of 50 kilobars is applied for 10 minutes at ambient temperature. A sample of the new polymorph of $CaSi_2$ is also prepared in a manner identical to that of Example 2. These two samples are then tested with a General Electric portable double Wheatstone bridge connected to a pair of probes between which the samples are squeezed. Several measurements of resistance are made on each sample until essentially constant readings are obtained.

The electrical resistivity of the commercial $CaSi_2$ was found to be more than 10 times the resistivity of the new high pressure polymorph of $CaSi_2$, thus demonstrating the markedly different electrical properties of the new polymorph.

*Example 4.—Reaction with concentrated hydrochloric acid*

A sample of $CaSi_2$ identical to that used as a starting material in Example 2 is ground to pass through 325 mesh Tyler Standard screen. A sample of the new high pressure polymorph of $CaSi_2$ identical to that produced in Example 2 is similarly ground to pass through a 325 mesh screen.

Identical amounts of each of the two forms of $CaSi_2$ are added to glass containers to which are then added identical amounts of concentrated hydrochloric acid. The containers are tightly sealed and allowed to stand for approximately one hour, after which time the vapor phase of each container is analyzed for hydrogen using a Bendix time of flight mass spectrometer and conventional procedures.

It is found that the hexagonal form of $CaSi_2$ has evolved approximately eight times as much hydrogen as has been evolved from the new high pressure polymorph of $CaSi_2$, thus demonstrating the pronounced and valuable chemical stability of the new material of the present invention.

*Example 5.—Stability of the new polymorph under vacuum*

A sample of the new polymorph of $CaSi_2$ identical with the product obtained in Example 2 is placed in a glass container and held at 30 inches of mercury vacuum and 110° C. for approximately 570 hours. At the end of this time the color is still coral as contrasted to the normal gray color of the hexagonal form of $CaSi_2$ and the X-ray diffraction pattern also remained the same.

*Example 6.—Long term stability of new polymorph of $CaSi_2$*

A sample of the new high pressure polymorph of $CaSi_2$ identical with that produced in Example 2 was analyzed by X-ray diffraction. Approximately one year and seven months after the initial analysis, a second analysis was run on the material which had stood at room temperature during the intervening time. The X-ray diffraction patterns found in these two analysis were in exact agreement and were both identical to that reported previously in Table II. These results demonstrate that the new polymorph is completely stable for all practical purposes.

*Example 7.—Stability of new polymorph at elevated temperatures*

Using the Chevenard Thermal Gravimetric Analysis apparatus and procedures described by Soulen and Mockrin, Anal. Chem. 33, 1909 (1961) a sample of the new high pressure polymorph of $CaSi_2$ identical with that produced in Example 2 is gradually heated under an atmosphere of pure dry oxygen. It is found that no oxidation results until a temperature of approximately 500° C. is reached, thus demonstrating further the high temperature stability of the new polymorph of $CaSi_2$.

*Example 8.—Determination of density of new polymorph and of starting material*

The density of the new polymorph was measured on a Berman torsion type density balance. The weight of each of the materials was first taken in air and then in toluene and the resulting observations were used to calculate the density.

The unchanged hexagonal form of $CaSi_2$ from a run at reaction conditions of 47 kilobars, ambient temperature and 10 minutes exposure gave a measured density of $2.47 \pm 0.02$ grams/cc. This value is in good agreement with the Bähm and Hassel value discussed above. A coral, high pressure form of the new polymorph produced in a run at 46 kilobars pressure, 1310° C., and 10 minutes using normal hexagonal calcium disilicide as the starting material was measured in the Berman density balance. The measured density was $2.60 \pm 0.02$ grams per cc.

A coral product with an X-ray diffraction pattern identical with that shown in Table II was produced at 80 kilobars, 1500° C. and 3 minutes exposure. The resulting density was measured on the Berman balance in toluene and in air, and found to be $2.76 \pm 0.02$ grams/cc. The severe conditions of this run produced virtually 100% yield of the new polymorph. Since the most severe conditions are known to produce a sample having the fewest voids and since voids are the largest single source of error in such density determinations, experimental error on the density measurement of this product is considered to be at a minimum and the value of $2.76 \pm 0.02$ grams/cc. determined on the product from the above run is considered the best experimentally obtained value of the density of the new polymorph of calcium disilicide.

*Example 9.—Determination of reaction conditions necessary for production of the new polymorph of calcium disilicide*

The starting material used in Example 2, hexagonal calcium disilicide containing approximately 6% Fe, is pulverized and pelletized. Into a pyrophyllite tetrahedral sample holder is inserted a graphite heater fitted with a graphite end plug, all as used in the Bureau of Standards reference cited previously. A 0.003" wall boron nitride capsule is inserted into the graphite heater. A pellet of calcium disilicide is inserted into the boron nitride capsule and is followed by a boron nitride wafer 0.015" in thickness which caps the capsule. The remainder of the tetrahedral anvil is assembled according to the Bureau of Standards' method.

The sample is then compressed by the application of hydraulic ram pressure directly to the bolster plates of the tetrahedral anvil apparatus. When the desired pressure of 88 kilobars is reached, the power to the electrical heaters is turned on and gradually increased until the product of voltage times amperage corresponding to the desired temperature of 750° C. is obtained. This value was established by previous calibration runs which determined this product of voltage times amperage versus temperature as determined by thermocouple. After the desired reaction time of 3 minutes, the electrical power to the heaters is switched off and the sample cools rapidly to ambient temperature. Approximately five minutes after the power is switched off, the pressure is released and the product removed from the sample holder. Any pieces of boron nitride or graphite are removed by probing with a dissecting needle and the product is sectioned for internal examination. Analysis of the product by X-ray diffraction confirms the presence of the new polymorph and microscopic examination of the specimen indicates a conpersion of better than 75%.

*Examples 10–30.—Preparation of new polymorph of $CaSi_2$*

Using the procedures outlined in Example 9, repeated preparations of the new calcium disilicide polymorph were performed using temperatures, pressures and heating times and providing yields as follows:

| Ex. No. | Temp., °C. | Pressure (kilobars) | Time (minutes) | Yield of New Polymorph of CaSi$_2$ |
|---|---|---|---|---|
| 10 | (1) | 50 | 10 | N |
| 11 | (1) | 88 | 10 | N |
| 12 | 550 | 79 | 10 | N |
| 13 | 600 | 80 | 10 | N |
| 14 | 720 | 80 | 5 | P |
| 15 | 750 | 50 | 1.0 | P |
| 16 | 750 | 50 | 6 | P |
| 17 | 860 | 77 | 8 | G |
| 18 | 1,010 | 50 | 10 | G |
| 19 | 1,020 | 83 | 1.0 | G |
| 20 | 1,225 | 9 | 3 | N |
| 21 | 1,255 | 17 | 10 | P |
| 22 | 1,300 | 9 | 10 | N |
| 23 | 1,300 | 45 | 5 | G |
| 24 | 1,300 | 72 | 3 | G |
| 25 | 1,350 | 9.5 | 3 | N |
| 26 | 1,350 | 18 | 3 | P |
| 27 | 1,400 | 47 | 10 | G |
| 28 | 1,400 | 47 | 10 | G |
| 29 | 1,450 | 45 | 10 | G |
| 30 | 1,480 | 47 | 10 | G |

[1] Ambient.

Yields marked G were in excess of 75% of the new polymorph; those marked P indicated some conversion to the new polymorph; and those marked N indicated no characteristic X-ray diffraction pattern of the new polymorph upon X-ray analysis. All observations of yields were based on visual observation of the specimen after the reaction conditions were applied and all specimens were examined by X-ray diffraction. X-ray diffraction analysis confirmed the presence of the characteristic pattern for the new polymorph in each of the runs marked G or P, but the characteristic lines of the new polymorph were missing from the X-ray diffraction analysis of each of the yelds marked N.

*Examples 31 through 35.—Preparation of the new polymorph of CaSi$_2$*

Using the CaO, Si and carbon starting materials of Example 1 and the procedures described most fully in Example 9, the following preparations of the new polymorph of calcium disilicide were prepared under the following reaction conditions:

| Example Number | Temp., °C. | Pressure (kilobars) | Time (minutes) |
|---|---|---|---|
| 31 | 1,300 | 45 | 10 |
| 32 | 1,500 | 45 | 10 |
| 33 | 1,525 | 44 | 2.0 |
| 34 | 1,830 | 51 | 10 |
| 35 | 2,000 | 50 | 4.0 |

The yield in each of the above examples was low but the presence of the new polymorph of calcium disilicide was confirmed by the appearance of the characteristic pattern of the polymorph in the X-ray diffraction analysis of each of the specimens after the reaction conditions had been applied for the time indicated.

Many different embodiments of this invention may be made without departing from the spirit and scope thereof, and it is to be understood that the invention includes also such embodiments and is not limited by the above description.

What is claimed is:

1. A polymorph of CaSi$_2$ having an X-ray diffraction pattern essentially as follows:

| $d$ (A.): | I |
|---|---|
| 2.77 | 100 |
| 2.28 | 80 |
| 2.14 | 55 |
| 1.76 | 55 |
| 1.56 | 50 |
| 1.512 | 30 |
| 1.326 | 30 |
| 1.235 | 25 |

2. A polymorph of CaSi$_2$ as defined in claim 1 having a density of at least 2.60 grams per cubic centimeter.

3. A process for producing the polymorph of claim 1 which comprises heating to a temperature of at least 800° C. at a pressure of at least 20 kilobars, ingredients selected from the group consisting of calcium disilicide and precursors of calcium disilicide.

4. The process of claim 3 wherein the ingredient is calcium disilicide.

5. The process of claim 3 wherein the ingredients are precursors of calcium disilicide.

6. The process of claim 5 wherein the precursors of calcium disilicide comprise calcium oxide, silicon, and sufficient quantity of reducing agent to completely reduce the oxides.

7. A process for producing the polymorph of claim 1 which comprises heating to a temperature of at least 1000° C. at a pressure of from 40 to 80 kilobars, ingredients selected from the group consisting of calcium disilicide and precursors of calcium disilicide.

8. The process of claim 7 wherein the ingredient is calcium disilicide.

9. The process of claim 7 wherein the ingredients are precursors of calcium disilicide.

10. The process of claim 9 wherein the precursors of calcium disilicide comprise calcium oxide, silicon, and sufficient quantity of reducing agent to completely reduce the oxides.

References Cited by the Examiner

UNITED STATES PATENTS 2,544,414  3/1951  Bridgman et al. ____ 23—209.1 X

OSCAR R. VERTIZ, *Primary Examiner.*

EARL C. THOMAS, *Examiner.*

UNITED STATES PATENT OFFICE
CERTIFICATE OF CORRECTION

Patent No. 3,317,279 May 2, 1967

Meyer S. Silverman

It is hereby certified that error appears in the above numbered patent requiring correction and that the said Letters Patent should read as corrected below.

Column 2, line 10, for "device" read -- devices --; column ., line 14, for "elecrtolysis" read -- electrolysis --; column 4, line 32, for "+50° C" read -- +50° C --; column 5, Table I, third column, line 4 thereof, for "1.55" read -- 2.55 --; same column 5, Table I, fifth column, line 4 thereof, for "1.75" read -- 1.76 --; line 49, for "definitely" read -- definitive --; column 8, line 12, for "Bähm" read -- Böhm --; lines 69 and 70, for "conpersion" read -- conversion --.

Signed and sealed this 7th day of November 1967.

(SEAL)
Attest:

Edward M. Fletcher, Jr.

Attesting Officer

EDWARD J. BRENNER

Commissioner of Patents